(12) United States Patent
Muirbrook (10) Patent No.: US 7,055,457 B2
(45) Date of Patent: Jun. 6, 2006

(54) METHOD FOR EFFICIENT MILKING

(76) Inventor: Carl T. Muirbrook, P.O. Box 917, Turlock, CA (US) 95381

( * ) Notice: Subject to any disclaimer, the term of this patent is extended or adjusted under 35 U.S.C. 154(b) by 0 days.

(21) Appl. No.: 10/412,496

(22) Filed: Apr. 11, 2003

(65) Prior Publication Data

US 2004/0200422 A1    Oct. 14, 2004

(51) Int. Cl.
*A01J 7/04*    (2006.01)

(52) U.S. Cl. .................... 119/14.02; 119/651

(58) Field of Classification Search ............. 119/14.02, 119/14.18, 651, 670; 604/290
See application file for complete search history.

(56) References Cited

U.S. PATENT DOCUMENTS

| | | | |
|---|---|---|---|
| 2,532,088 A * | 11/1950 | Cordis | 119/670 |
| 3,310,061 A * | 3/1967 | Bender | 134/58 R |
| 4,199,564 A | 4/1980 | Silver et al. | |
| 4,434,181 A | 2/1984 | Marks, Sr. et al. | |
| 4,945,110 A | 7/1990 | Brokken et al. | |
| 5,017,369 A | 5/1991 | Marhevka | |
| 5,063,249 A | 11/1991 | Andrews | |
| 5,366,732 A * | 11/1994 | Zighelboim R | 424/411 |
| 5,529,770 A | 6/1996 | McKinzie et al. | |
| 5,635,492 A * | 6/1997 | Corby | 514/54 |
| 5,661,170 A * | 8/1997 | Chodosh | 514/390 |
| 5,762,948 A * | 6/1998 | Blackburn et al. | 424/404 |
| 5,776,479 A | 7/1998 | Pallos et al. | |
| 6,234,110 B1 * | 5/2001 | Xavier | 119/14.47 |
| 6,276,297 B1 * | 8/2001 | van den Berg et al. | 119/14.01 |
| 6,525,071 B1 | 2/2003 | Dyer | |

OTHER PUBLICATIONS

Reid, D. A. & Johnson, A.P.; "Trouble Shooting Herds With Poor Teat Condition"; Nat'l Mastitis Coun. Annual Mtg. Proceedings (2003); p. 126 4th ¶.

Wallace, J.A. et al.; "Measuring Stimulation's Effect with Milk Flow Curves"; Nat'l Mastitis Coun. Annual Mtg. Proceedings (2003); p. 86, 1st & 2d ¶; p. 29, 2d ¶; p. 96, 2d ¶.

* cited by examiner

*Primary Examiner*—Robert P. Swiatek
(74) *Attorney, Agent, or Firm*—George S. Cole, Esq.

(57) ABSTRACT

A method for milking animals, particularly domesticated dairy animals, and most particularly dairy cattle, that improves milk/food sanitation, labor and cost efficiency, environmental friendliness, and throughput, that uses a wet prep and minimizes both interactions with the animal being milked and delays between steps during which recontamination of teats can happen. The best method comprises the steps of preparing the milker's hands, priming the animal's teats, attaching a feeder tube to a milking machine to each teat, and completing the milking. (Therefore through the method we sanitize the milker's hands, cows teats and feeder tube all in one step.) By preparing the milker rather than the udder and teats, the method eliminates steps and delays, and reduces chances for infection, material usages, and complexity, that were extant in the prior art.

5 Claims, 5 Drawing Sheets

Prior Art

| PRIOR ART | MUIRBROOK METHOD |
|---|---|
| Germicidal Solution (mostly Chlorine or Iodine based) | Preparatory Solution (Sanitizing & Germicidal) |
| Solution Storage Tank | Solution Storage Tank |
| Sprayer or Dip Applicator | Sprayer, Dip or Squirt Applicator, or Dip Bucket (preferred) |
| Removal Means (Rinsing spray or towel) | |
| Gloves for Milker | Gloves for Milker (optional) |
| Spray Goggles for Milker | Spray Goggles for Milker (optional) |
| Rinsing Spray to wash-off floor build-up | |
| Water for rinsing | |
| Milking Machine w/ Feeder Tube for each Teat | Milking Machine w/ Feeder Tube for each Teat |
| Second, non-caustic, long-term germicidal solution for post-milking protection (optional but preferred) | |

FIGURE 5

METHOD FOR EFFICIENT MILKING

BACKGROUND

1.A. Field of the Invention

This invention is in the field of methods for milking animals. While the application and the preferred embodiment discuss milking domesticated dairy cattle, the method of this invention is equally suitable for sheep, goats, and other domesticated dairy mammals, and also suitable for other mammalian milking opportunities.

1.B. Description of the Related Art

The days when Heidi milked the family cow have passed. Modern dairy milking is increasingly driven by the need for efficiencies in time and costs, as are almost all present-day agricultural, industrial, and post-industrial processes. Most inventions in this field focused on new equipment (thereby increasing the capitalization required per head). Some focused on improved layouts for the milking facility (the 1990's saw the advent of the 'carousel' or 'roundabout' milking barn). Further efforts focused on improving and automating the monitoring of the milking; nowadays, the most advanced diaries have at least a milking computer placed in each milking stall, in addition to a central processing and monitoring unit tracking the entire herd's overall condition and milk production.

Getting milk from the udder of a mammal seems straightforward, even an epitome of simplicity. After all, can't every baby mammal manage to do so from the day it is born? But a number of concerns arise when the natural process intended to feed calves is directed (or suborned or hijacked, as PETA might claim) towards hygienic, safe, effective, and reliable production of milk for the marketplace.

Cow udders are normally not sanitary, as they are exposed to the external environment. Contaminating contact can be direct or indirect, e.g. when a hoof brushes the udder or teat when the cow kicks at a fly. Using external antiseptics to sanitize (cleanse and disinfect) the udder and teats greatly improved the hygienic quality of the collected milk, even before it was pasteurized. Today, both udder and teats are sanitized by being swabbed, dipped or sprayed with a germicidal composition, typically iodine-based. This greatly reduces the bacterial spreading both into the milk collected and amongst the cows being milked by the same milking machine.

Most of the germicidal compositions presently in use require a delay or 'kill time' between application and the next step, as their manufacturers and the dairymen recognize that these compositions do not provide an 'instant kill'. This means the method for milking every cow using the prior art must incorporate a 30 to 60 second delay—an interval that adds up when hundreds of cows are being milked. (In fact, if the herd is milked four times a day, or every six hours, at most 360 cows can pass through a single stall each time.)

Prior patents have focused on the compositions, but said little about how such are actually applied. Pallas, et al., U.S. Pat. No. 5,776,479, noted there were two general approaches to providing protection: "using a germicide solution which reduces the number of microbes, or forming a film-forming barrier over the cow's udder which prevents microbes from entering the milk channel;", but conceded implicitly that neither method was an advance over the prior art, which was stated in that patent's background as including " . . . teat dips to provide both a continuous barrier film on the cow's teat which persists between milkings and anti-microbial activity . . . " All Pallas had to say about how any solution was used was, "Typically, the compositions of the invention are applied to the teats, preferably after each milking, by dipping the teat into the liquid composition . . . " (Similar statements are found in Andrews, Jeffrey F., U.S. Pat. No. 5,063,249, "The teat dip concentrate formulation of Example 1 (i.e., the formulation containing 12.00% of the "Tego 51B") was applied to all of the teats of four cows in a field trial using normal procedures (i.e., applied twice a day, after each milking) . . . "; Marhevka; Virginia C., U.S. Pat. No. 5,017,369: "Since dairy farmers are fully accustomed to the use of teat dips, dipping the teats in a cup or other receptacle containing a composition of this invention is the preferred method of applying a coating to the animal's skin . . . "; Brokken, et al., U.S. Pat. No. 4,945,110, "When applied to the animals' teats and udder quarters . . . "; Marks, Sr., et al., U.S. Pat. No. 4,434,181 (1984): "a liquid at room temperature in which one can immerse an animal teat to provide a liquid coating that adheres to the animal's teat . . . "; Silver, J. et al., U.S. Pat. No. 4,199,564 (1980): "There is provided a method for preventing mastitis in the teats of animals comprising applying to the teats that composition and allowing the composition to dry on the teats . . . ")

Other patentees have presumed an equivalence between the field and the laboratory and never left the latter. (See, e.g. McKinzie, et al. U.S. Pat. No. 5,529,770: "In particular, the four dips were tested to determine their film-forming characteristics. In each case, twenty-five 16 mm diameter glass culture tubes were initially weighed and dipped in the particular teat dip to a depth of 6½ to 7 cm. After dipping, the 25 tubes were allowed to drain for 1 to 1½ minutes and were weighed to provide a wet weight. The tubes were then allowed to dry in ambient air for a period of 45 minutes, whereupon the tubes were reweighed to provide a dry weight.")

A very recent patent offers little further help. Dyer, D., U.S. Pat. No. 6,525,071, when discussing how the composition which is the focus of that patent is used in the dairy, merely states: " . . . administering the compositions to mammalian skin, specifically the udder and teats of milking animals . . . ". That patent did add a bit more detail as to their method of application in an example, where it added the details of: "using a spray-application device . . . compositions applied prior to milking were removed by wiping the teats with a clean disposable towelette before the animal was milked; the antimicrobial compositions applied immediately after the milking were left on the animal and not rinsed off." But for the most part, the prior art is something 'applied' rather than considered.

However once sanitized, the udder and teats then have to be cleaned of this solution, by being either wiped dry or sprayed a second time with water or a neutralizer and then wiped dry. For cleansing and disinfecting solutions based on iodine are caustic; and when applied over days, weeks, and years (literally thousands of exposures), these solutions will chap, burn and harm the teats and udder, if not thoroughly washed off. The person milking the animal is both strongly advised, and prefers, to wear gloves to protect her or his own skin against this solution, despite the decrease in sensitivity and the increase in effort incurred.

Dairy owners, and bovine specialists, have long since established the importance of the 'let down' to milking, that is, the relaxation of the teat sphincter muscle which permits the emission of milk when suction is applied to the teat. Stimulation of the teat is a necessary precondition for the let-down to occur, and the proper stimulation can shorten the time interval between attaching a feeder tube from the milking machine to the individual teat and the emission of milk from the udder in response to the vacuum suction in that feeder tube. The existing art focuses on the manual priming of each teat, which means giving each a tug to bring milk down from the udder to the tip of the teat. This manual priming also stimulates the production of oxytocin (the hormone governing milk let-down) within the animal. The better a milking method is at oxytocin stimulation, the sooner and less constricted the milk flows through the teat sphincter. Part of the reason that the delay for the germicidal 'kill time' has been ignored in the dairy industry, is that the prior art also incorporated a 'let down' delay between the time a teat was primed, and the time the cow was ready to begin milking. But calves rarely are as patient, and the closer the stimulus is to the instinctive expectation, the sooner the milk will flow.

Repetitive tugging at each teat, particularly when combined with a suction effect, stimulates the animal being milked into letting down the milk and empties the udder. Some skill had to be used to reliably deliver the milk to the collection bucket, as Heidi learned. The vacuum-operating milking machine replaced the milkmaid with a tireless and less obtrusive milker, or at least one that didn't require coffee breaks or was at less hazard of hoof imprints. But this still required external intervention, as somebody had to attach an individual feeder tube to each teat.

And so the current method of milking evolved into a seven-step process, which is detailed in FIG. 1 and FIGS. 2, 2A through 2D. Each animal that is to be milked is herded into an individual stall equipped with all the necessary equipment and supplies (some fixed and used for every animal, some variable and disposed with each use). Then the modern Heidi (or Hermann or, in much of the southern and western United States, Hernandos) will: (1) apply a sanitizing solution to the udder (40) and teats (42), typically by dipping using a dipping cup (44) or spraying using a sprayer (46) and spray (48); (2) prime each teat in turn; (3) wipe dry the udder (40) and teats (42) with a (disposable) towel (50) to clear off any remaining and excess sanitizing solution; (4) attach to each teat a feeder tube (54) to the milking machine, whereupon (5) milking takes place. After the cow has been milked, then the milker will (6) remove each feeder tube; and, finally, (7) again spray or dip the udder and teats with a longer-term germicidal and 'barrier' solution.

The milker will interact with the dairy animal in each of steps 1, 2, 3, 4, 6, and 7—in other words, in all but step 5. These interactions are marked with an 'I' in FIG. 1. Each such interaction is something to which both the milker and the dairy animal must become habituated and, however domesticated the breed may be, at any interaction a particular animal may react antagonistically. Also these interactions can upset, frighten the cow to where she will not release or let down her milk. There is always some risk of the animal reacting to each motion of the laborer, putting an understandable stress on the human who may be kicked, bumped, squeezed against the stall's side, or trampled on. And each step requires both habituation of each animal, and training of each milker, to that step. Since there is continual turnover in the dairy business of both animals and milkers in the barns, this last burden is both real and ongoing.

Separating steps 1&2, 2&3, and 3&4 is an interval during which the cow being milked may kick or react to the motions and sensations of the previous action; and thus, a small chance of contamination (or re-contamination) of the teat from the animal's hoof, leg, or tail, which can adversely affect the milk quality. These delays accommodate for both the 'kill time' and some part of the 'let down' time mentioned above. Each interval creates a re-contamination risk, and so these are marked with a 'c' in FIG. 1. There is also the risk of contamination after the feeder tubes are removed, a risk which may last until the next milking; this is marked with a 'c*' in FIG. 1.

The seventh step, post-milking (7), shown in FIG. 1, of spraying again the udder and teats with a different sanitizing and germicidal solution, has become the part of the preferred prior art; this is done in order to reduce mastitis. Because the teat canal can remain open for up to 30 minutes after milking, as it may take that long for the teat-end sphincter muscle to tighten, and because a prime milk cow may be milked as much as four times in 24 hours and will be milked 7 days a week, any sanitizing solution that will remain on the udder or teat should minimize its caustic effect as a secondary goal, reducing its tendency to irritate or damage the skin and mucosal membranes of the teat and teat canal. This is because, while there may be no risk of contaminating the already-collected milk, there is always some risk the teat channel may be contaminated before the next milking while the cow is in the field.

Finally, there is always a pause between steps (4) and (5), a pause which is the function of the gap between the natural and modern processes. Dairy cows originally evolved to suckle their offspring. And despite the miracles of both stock-breeding and genetic engineering, they have not as yet evolved reflexes and stimulus-response patterns most suited to even the best vacuum tubes of milk machinery. This pause between the attachment of the feeder tube and milk let-down may seem insignificant, measuring perhaps seconds per teat per animal—but any pause multiplied by hundreds begins to become noticeable in a 24-hour, 7-day dairy operation where the milking never ceases.

Modern dairies have generally depended upon halide (more specifically, iodine- or chlorine-based) compositions for their sanitizing, pre-milking application. These have generally imposed a noticeable environmental burden on the teats and udders of the dairy cows, the hands of the laborers, and the soils and environs with which they come into contact day after day, month and year after month and year, because of their caustic nature. These solutions also must be cleaned off the teats and udder, preferably before the milking occurs, lest their presence chafe, burn, or stress the teat; crack, weaken, or damage the material(s) of the feeder tube; or degrade the quality of the collected milk where they are not allowed. These unwanted side effects of halide compositions also impose additional material burdens in the form of wiping towels, multiple sprayers and sprays, gloves for the milkers, and even multiple, different germicidal compositions. But the continued low cost and fairly broad microbiocidal spectrum provided by the halide compositions, plus the innate conservatism of even modern dairymen, have led to their continued usage despite their problems and costs.

SUMMARY

Reducing the number of operations required to prepare an animal for milking, reducing the number of close interactions with an animal being milked, reducing the amount of consumable supplies required for each animal being milked, more closely simulating natural stimuli which promote milk let-down, providing continued germicidal protection between milkings, and lessening the environmental impact of the entire milking process, all promote increased efficiency in both costs and time, and improved quality of product, in milking a herd of dairy animals. When combined with the use of a preparatory solution designed to enable these goals, not only are these objectives attained, but also gained are improvements in milk quality, herd productivity, worker safety and productivity, and hygienic effectiveness.

Contrary to current, and long-standing, dairy industry wisdom and practice, the method stated in this invention's best mode uses what is called a 'wet prep', namely, one that purposefully leaves the teat wet rather than dry. In the preferred embodiment, the milker first dips a hand up to mid-palm into a preparatory solution having sanitizing and emollient effects, then wrings his hands together to spread the preparatory solution over the palmar surfaces of both hands and all fingers. In an alternative embodiment, the milker prepares the palmar surfaces of both hands with the preparatory solution and omits the step of wringing them together to spread the preparatory solution. Next the milker simultaneously rubs the surface of a teat to cleanse it, and primes that teat, for all teats, each with a single pull of a hand, thereby simulating the initial take-up, wetting, and suckling action of a calf. As quickly as he can after priming a teat, the milker then attaches a feeder tube from a milking machine to that teat, after which milking begins. In an alternative embodiment the milker will rub the surface of each teat, cleansing it; prime that teat, with a pull of his hand; and then as quickly as he can after priming a teat, attach a feeder tube from a milking machine to that teat. In yet another alternative embodiment the milker will cleanse, prime, and then attach feeder tubes to pairs of teats together.

Because the combined stimuli which the cow experiences (a wet contact, pulling, and suction) more closely match the natural stimuli of a calf's suckling, the cow lets its milk down more readily, more rapidly, and more consistently. As there are fewer interactions between the milker and the cow, and fewer and shorter delays between the sanitizing of the teats and the attaching of the feeder tubes, there are fewer chances for recontamination of a teat, less demand for habituation of the cow to multiple steps, and less training required for the milker, in the entire milking process.

Finally, because the germicidal composition used in the best method contains surfactants, emollients, and is non-caustic, it both can remain in the feeder tube between cows and on the teats between milkings where, as it penetrates the surface layers of the skin, it provides built-up and continuous germicidal protection that reduces both milk contamination and mastitis in each cow milked using this method. Thus, when the cow has been milked, there is no need to wash off the teat and udder or to apply a second and non-caustic germicidal protective solution to prevent infection, either during the half-hour afterwards when the teat channel remains open, or during the hours between milkings when the cow's teats and udder are exposed to the environment.

DETAILED DESCRIPTION

Overview

All modern milking, in order to meet hygienic standards, must sanitize and decontaminate the udders and teats of the dairy animals being milked. (Hereafter the specification will discuss the application to dairy cattle, or an individual cow, though the same method could be applied to sheep, goats, or other domesticated mammals.)

Traditionally, and in the prior art, each cow is trained to enter a stall where it will be milked. This method will work for a flat barn, herringbone, parallel, carousel, or any other milking barn, as these shapes distinguish the flow of cattle into and through the stalls but do not govern the milking process for each cow in its stall as it is milked.

At or immediately by the stall (within easy reach of the milker) will be everything needed for the milking, including the fixed machinery, the consumable supplies, and the record-taking means by which the productivity and process can be tracked for each cow, each milker, and over the entire process and herd. In the most modern dairies there will be a computer at each stall with process-oriented displays, and the milk output and production are subject to stopwatch-clicking timing and volumetric measuring where tenths of seconds and grams of milk are tracked and counted. Like all modern processes, the rewards go to those who show industry and ingenuity, who do more, quicker, with less; less material consumed by the process, less time for the average cow to be milked, and less stress on the external environment from the byproducts of the milking process.

Because cows are not continuously kept in a hygienic environment, their udders and teats are subject to contamination from any number of microorganisms and bacteria which are common in the external environment. Mother Nature is not a slob, but she does not spray the fields with Lysol, either . . . and the cows definitely give cause for the grass to grow greener after they have passed. Because of this, before any cow is milked the prior art required that its udder and teat be cleansed and sanitized. The focus was on preparing the cow for this process. And for at least fifty years, the traditional method of milking a cow required that its udder and teats first be sprayed with a preparatory iodine- or chlorine-based solution. Which solution then had to be washed or wiped off, because the solution itself was polluting the milk and had some pretty deleterious effects on the rubber or plastic components of the feeder tubes from the milking machines which made automated milking feasible! Thus, generations of dairy scientists have taught that the best method for milking cows starts with a 'dry prep', where the teats are dried before the feeder tubes are attached.

The method in this invention's best mode differs significantly in both its orientation and its initial approach to the milking process. Rather than focusing on preparing the cow's udder and teats, the preferred method focuses on preparing the milker's hands, so that the milker can with a minimum number of interactions sanitize and prime the cow's teats. And the preferred method uses what is called a 'wet prep'; the surfaces of the teats of the cow about to be milked are not dried after the sanitizing and germicidal preparatory solution is applied and before a feeder tube from the milking machine is attached to each teat. This contradicts over fifty years of dairy practice and the prior art—but results in significant improvement in milk quality and significant savings in time, both for each cow milked, and thus for the entire herd at each milking. And that, in turn, means that a dairy can run more cows for a given number of stalls and capital equipment, improving its return on investment.

The preferred method is illustrated in FIG. 3 and FIGS. 4, 4A through 4D. Once a cow is entering its stall to be milked, the milker responsible for preparing a dairy cow for milking (the 'milker') takes position to the side and/or rear. That milker first (11) dips a hand (56) into container (58) containing a preparatory solution (59) having germicidal and emollient effects. The hand, which may or may not be in a glove, will be immersed up to mid-palm (or, in an alternative embodiment, to a point on the palm's surface above the midpoint of the central metacarpal); in any event, the hand will be immersed sufficiently far to ensure that some of the preparatory solution is retained in the palm of the hand and fingers when it is removed from the dip. Next, the milker rubs together the palms of his hands and front surfaces of his fingers (56, 60), thereby spreading the preparatory solution over both hand's anterior surfaces (12). Next, with as little delay as possible, and preferably within a four-second interval of dipping his hand and wringing his hands together, the milker simultaneously rubs the surface of each teat and primes that teat (13) with a pull of his hand, grasping each teat at the top of the teat (42) where it connects with the udder (40) between the palm and the fingers of one hand, or in an alternative embodiment, between the thumb and index finger, pulling downward on and sliding downwards along the surface of the teat, thereby squeezing out the milk and somatic fluids stored in the teat channel (52) and simulating the suckling 'take-up' of a calf. (In the preferred embodiment, this ten second interval includes dipping the hand, sanitizing and priming the teats, and attaching the feeder tubes.) Then the milker attaches (14) a feeder tube (54) from the milking machine to each teat (42), after which milking begins (15). When the cow is done milking, the feeder tubes are removed, or may drop off automatically, depending on the sophistication of the milking machine (16).

In this method, there is but one interval where recontamination is a possibility, between steps (13) and (14); again, this is marked with a 'c'. There are also only three steps where the milker interacts with the cow, steps (13), (14), and (16); again, these are marked by an 'I'. By comparing FIG. 1 and FIG. 3, it can be seen that this method cuts the number of interactions between the milker and the cow in half, and cuts the number of potential recontamination delays by at least a like amount. Instead of requiring both a 'kill time' and 'let down' time, this method focuses on moving from preparation to milking as rapidly as is feasible while providing greater sanitizing of all interacting elements—and it provides both a better bacterial kill and significant time savings over the prior art.

In an alternative embodiment, the milker dips both hands into the preparatory solution up to the base of the palms (more specifically, to the distal edge of the transverse carpal ligament) and then simultaneously rubs the surface of each teat and primes that teat with a pull of a hand as specified above. He then attaches a feeder tube to each teat, after which milking begins.

In yet another alternative embodiment, the milker will dip only one hand into the preparatory solution up to the base of the palm (more specifically, to the distal edge of the transverse carpal ligament) and then simultaneously rub the surface of each teat and prime that teat with a pull of that hand as specified above, using his other hand to attach a feeder tube from the milking machine to the teat just prepped and stimulated.

In yet another alternative embodiment, the milker will use a pre-set dispensing unit that delivers a unit of the preparatory solution into the palm of his hand, and then rub his hands together as above.

In yet another alternative embodiment, the milker will use a pre-set dispensing unit that delivers a unit of the preparatory solution into the palm of each hand, and then for each hand rub the fingers and thumb against the palm to distribute the preparatory solution over the anterior surface of his hand, fingers, and thumb.

In yet another alternative embodiment, the milker will place his palm and the front surfaces of his fingers and thumb of a single hand into the surface of the preparatory solution, and then rub his hands together as above.

In yet another alternative embodiment, the milker will place the palms and fronts of his fingers and thumbs of both hands into the surface of the preparatory solution, covering the front surfaces of each hand directly.

Thus a milker may prep and use both hands, or prep and use but one hand, as long as the palm, fingers, and thumb of a hand are coated with the preparatory solution before being applied to the surface of the teats of the cow to be milked.

The preparatory solution should be kept free of contamination itself or, if exposed to contamination, say through repeated dippings or being left open to the environment, is best regularly replaced, at least after every other milking, or several hundred cattle for large herds.

After the hand, or hands, are prepared, next the milker will prime each teat. The teats for a particular cow may be primed separately or in pairs, sequentially with but one hand, or sequentially in parallel with both hands, from front to back, back to front, left to right, right to left, clockwise, or counterclockwise, according to the preference, dexterity, and training of the worker or the expectation, desire, or habituation of the cow being milked; but each teat must be sanitized and primed, but not dried, before a feeder tube is attached.

Advantages of the Invention

Because the combination of wetting, pulling, and suction experienced by the cow more closely match the natural stimuli of suckling by a calf, she lets down her milk more readily, more rapidly, and more steadily. Furthermore, because human nature generally assures that a milker will both prefer not to use a glove, and will keep a bare hand cleaner than a glove, this method accomodates a more natural flow of sanitation; and the skin-smoothing used on the teats lends that same quality to the milkers' hands.

Because there are fewer steps to the process, fewer contacts between the milker and the cow, and fewer delays between the priming and the attachment of the feeder tube, there are both fewer chances for recontamination of a teat during the milking process, and less habituation and training required for the entire milking process. Also, because the teat remains wet, this method better lubricates the tube-to-teat contact, both allowing a smoother, easier, and slicker attachment and providing a better vacuum seal, improving the performance of the milking machine while decreasing the stress on the cow.

Figure 1:
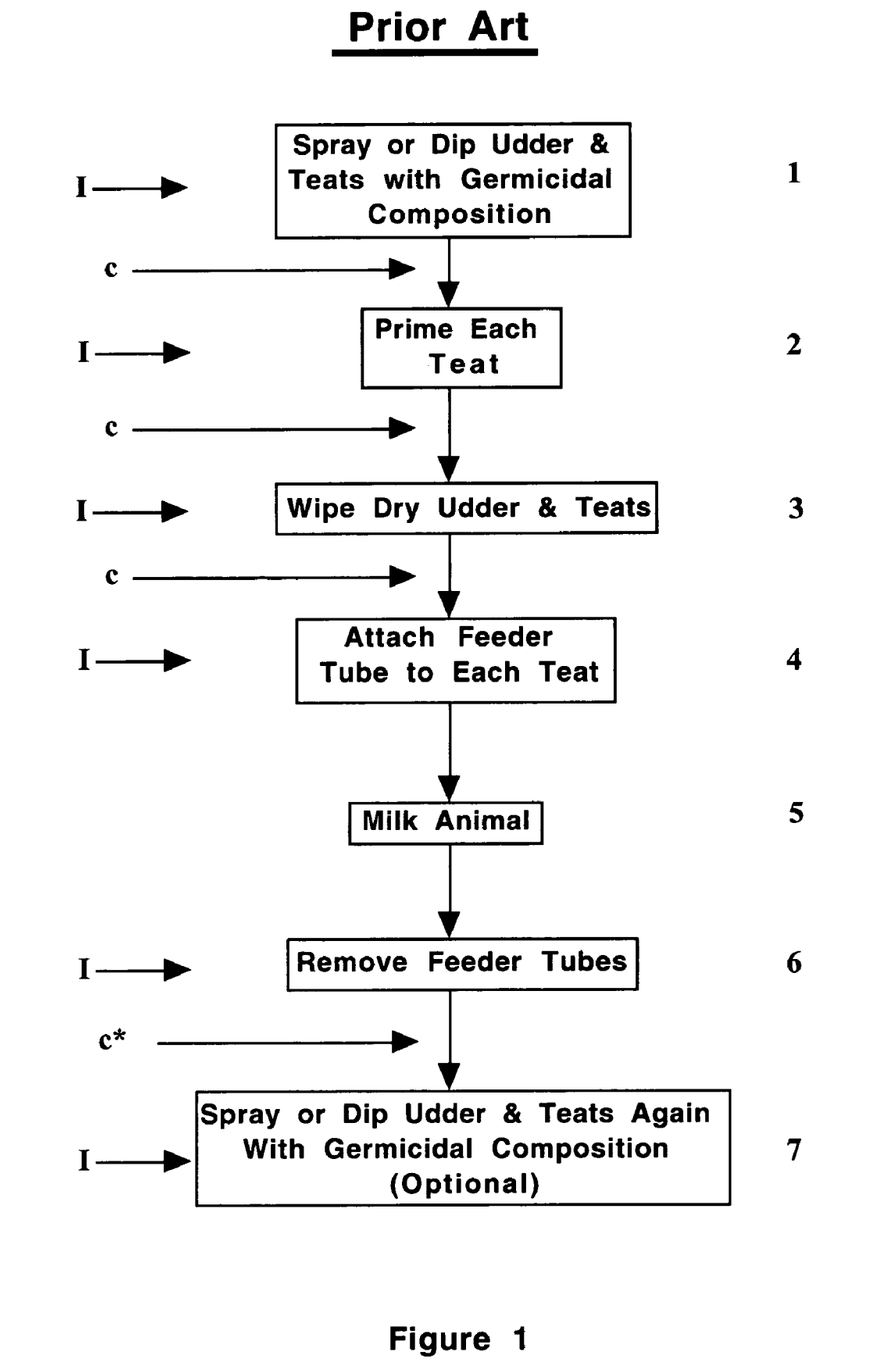
FIG. 1 is a flowchart of the prior method for milking a dairy animal, indicating the steps, the interactions between the human milker and the animal, and the delays between steps which present opportunities for unwanted recontamination of the teat(s).
Figures 2A, 2B:
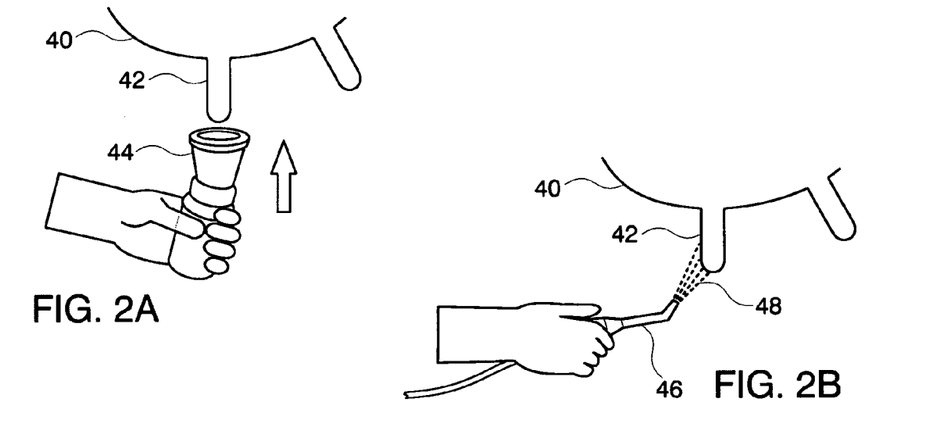
FIG. 2 is an illustrative representation of the prior art method.
Figure 2C:
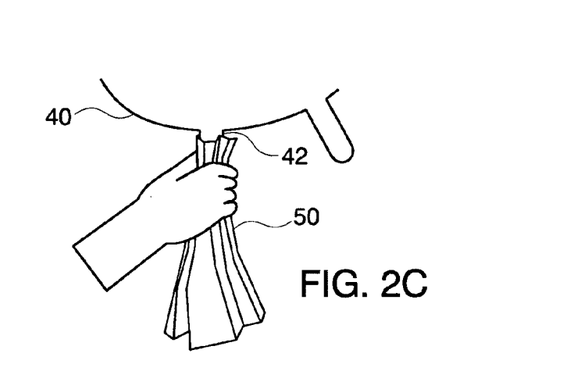
Figure 2D:
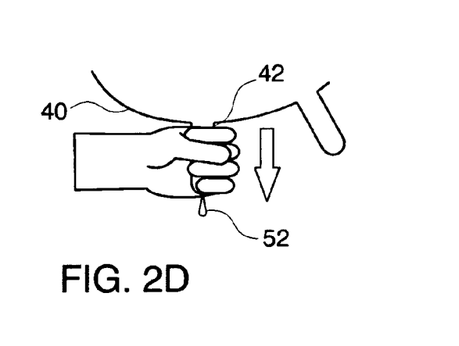
Figure 2E:
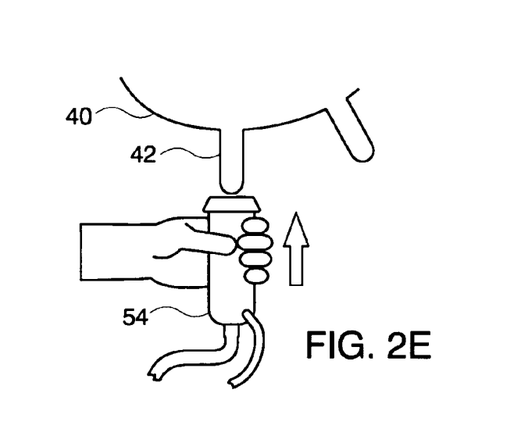
Figure 3:
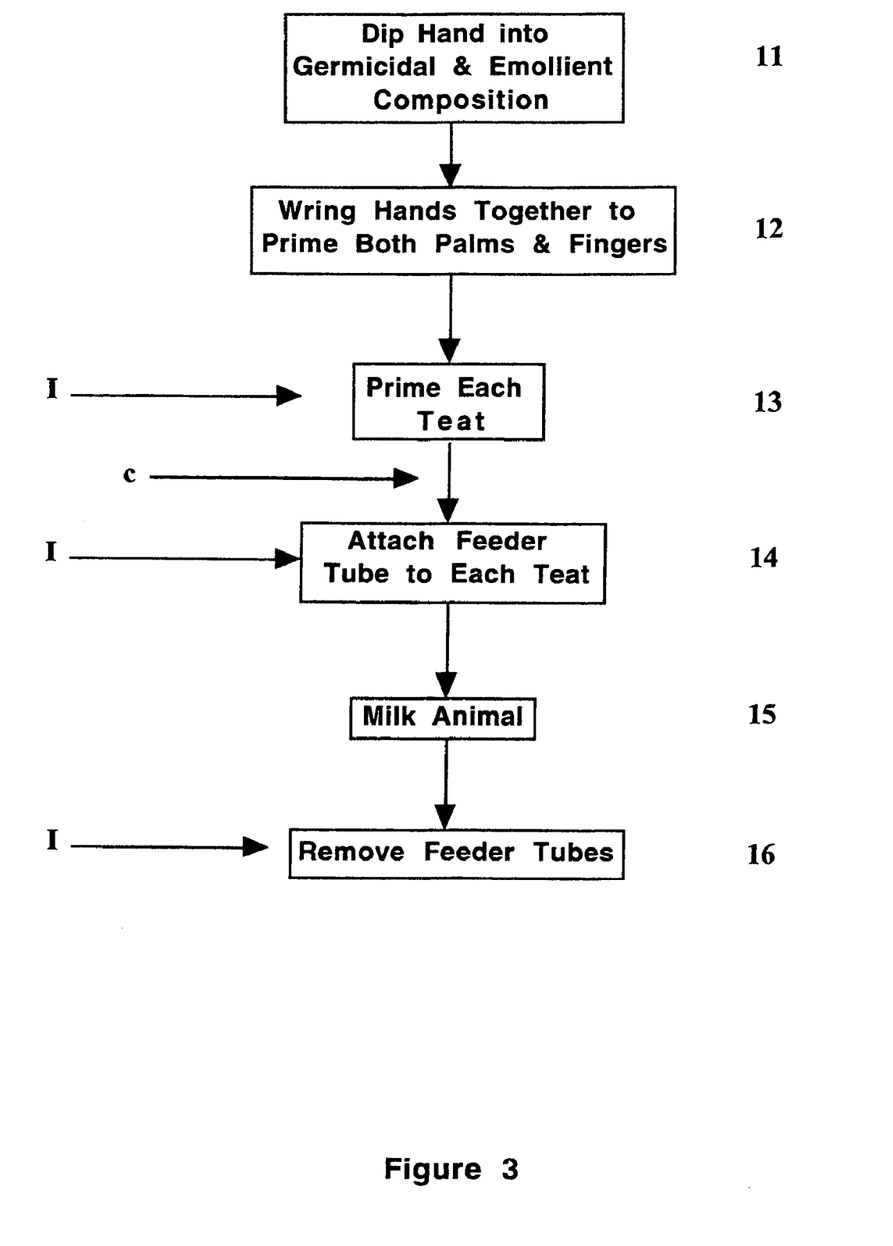
FIG. 3 is a flowchart of the method disclosed in this application, similarly indicating the steps, interactions, and delays, the latter two both significantly reduced.
Figure 4A:
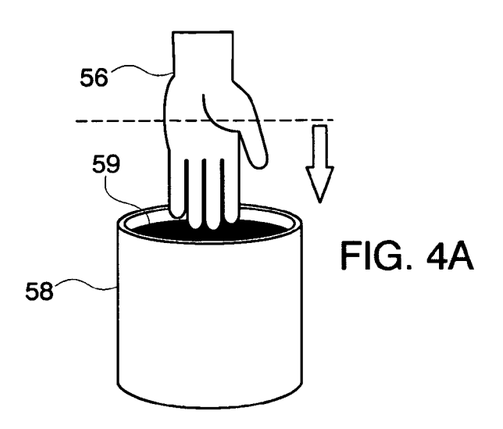
FIG. 4 is an illustrative representation of the method disclosed in this application.
Figure 4B:
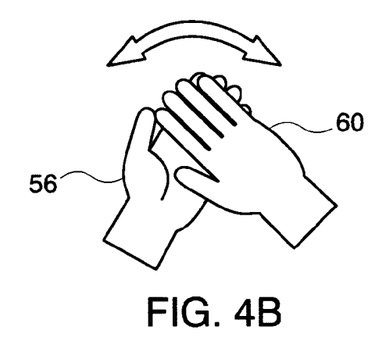
Figure 4C:
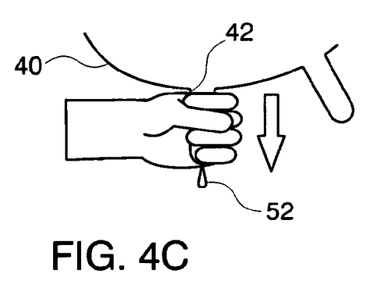
Figure 4D:
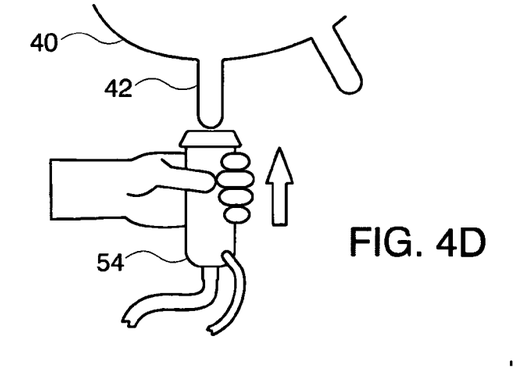
Figure 5:
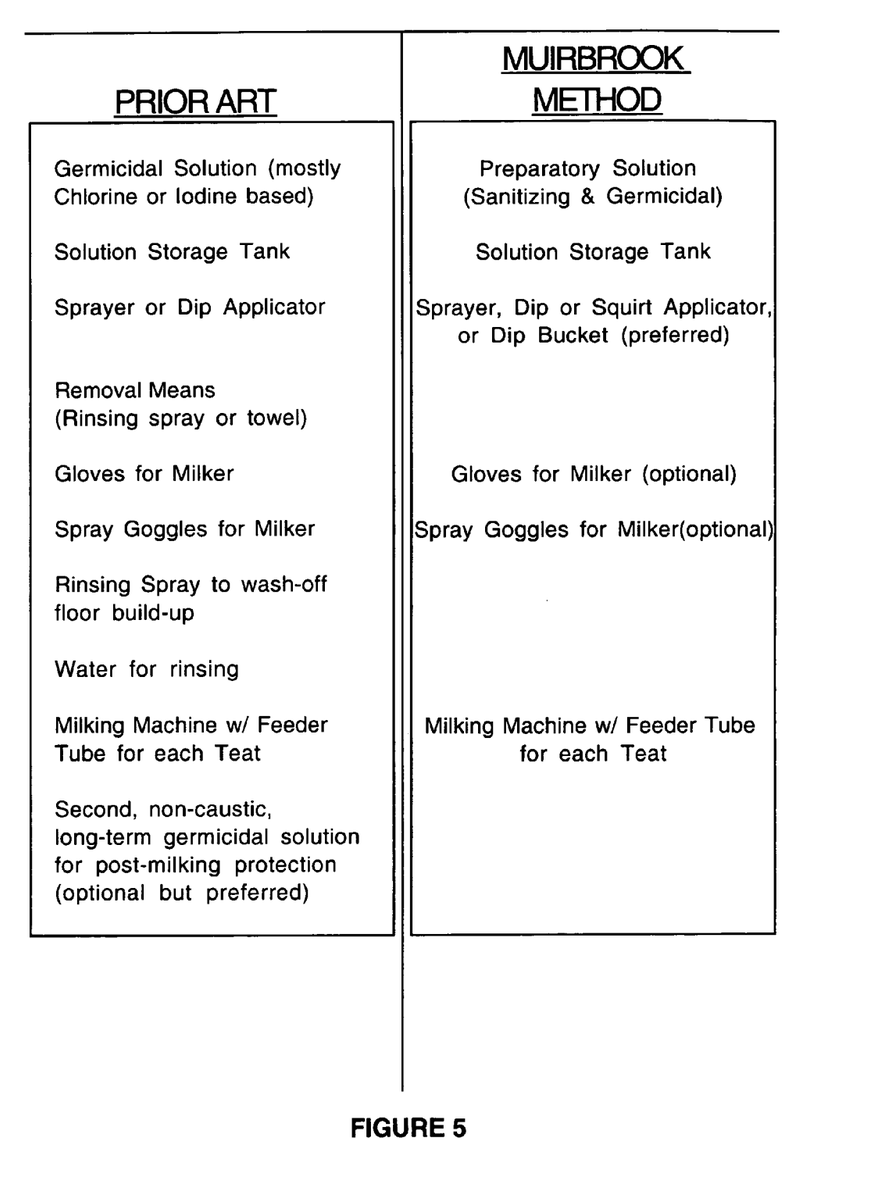
FIG. 5 is a comparative listing of the required fixed and variable material requirements of the prior art and the best mode of the present invention.

Because the method disclosed in this application requires less in the way of both fixed and consumed supplies, it decreases the costs of milking. A comparative list of the fixed and consumable requirements of the two methods is shown in FIG. 5.

Because the method provides a direct and physical smearing of the preparatory solution through manual stimulation onto the surface of the teat, it produces a build-up of the germicidal preparatory solution in the subcutaneous epithelial cells. Because it does not require that the preparatory solution be removed, it provides a more continuous sanitizing effect, particularly during the post-milking period when the teat channel can remain open and vulnerable to infection for as long as 30 minutes after the feeder tube is removed. For either or both such reasons this method provides a superior kill rate against common bacteriological organisms such as *Staphylococcus aureus* and *Streptococcus agalactiae*, as is provided through the use of halide sanitizing solutions, but without the latter's caustic effect. Furthermore, because bacteria take hold and flourish more in rough or damaged skin, and the emollient and smoothing effects lessen any roughening of the teat surface, this method reduces between-milking bacterial contamination.

One of the more irritating problems in modern milk production is the occurrence of bovine mastitis, which is almost exclusively initiated by pathogenic microorganisms that have entered the teat canal during or after the milking process. The condition occludes milk flow and production for an afflicted cow; mastitis-related milk losses can range from 10–25%. Bovine mastitis can also permanently reduce an cow's ability to produce milk. The usual sources of harmful microorganisms include unsanitary milking equipment, the milker, imperfect sanitation from misdirected spraying or otherwise flawed indirect sanitizing solution applications, other mastitic cattle, an unsanitary stable/pen environment, and the cow's own elimination (urination/defecation) processes. The method disclosed herein may provide as much as a 40%, and potentially higher, suppression rate in clinical mastitis for treated herds, thus greatly improving milk productivity for a given herd over time, when compared to the prior art.

Because the method provides more continuous sanitizing coverage, it also produces secondary decontamination of the milking machine's feeder tubes, reducing inter-animal contamination and improving quality in the collected milk.

The preparatory solution used in the method should be a composition including surfactants, allantoin emollients and benzalkonium chloride, as opposed to the prior art's povidone iodine—based, or chlorine-based compositions. The present best method uses the following chemical composition: water, 86.688%; Methocel J5MS, 0.25%;.Triethanolamine, 85% solution, 0.28%; allantoin, 12.08%; ammonyx LO Chemoxide LM30, 0.1%; Maquat 1412-80 or in substitution, Barquat MB-80, 0.041%; eucalyptol, 0.008%; methyl salicylate, 0.003%; and citric acid, 0.1%.

It is possible, as an alternative embodiment of this invention, to avoid preparing either the cow's udder or teats, or the milker's hands. Instead, the interior of each feeder tube's attachment cup is coated with the above preparatory solution (either by being dipped into a container of such solution, or by having such solution sprayed into the attachment cup), and then the feeder tube is attached to a teat. This is less-preferred, because the lack of priming both decreases the quality of the collected milk (as it increases the residual somatic cell count) and increases the let-down time (as it lacks the take-up priming stimulus) and so increases the milking time per cow.

While this invention has been described in reference to illustrative embodiments, this description is not to be construed in a limiting sense. Various modifications and combinations of the steps described in the illustrative embodiments as well as other embodiments of the invention will be apparent to those skilled in the art upon referencing this disclosure. It is therefore intended this disclosure encompass any such modifications or embodiments.

The scope of this invention includes any combination of the steps from the different embodiments disclosed in this specification, and is not limited to the specifics of the preferred embodiment or any of the alternative embodiments mentioned above. Individual user applications and embodiments of this invention may contain all, or less than all, of the steps disclosed in the specification according to the needs, proclivities, handedness, and desires of that user or the animal being milked. The claims stated herein should be read as including those elements and steps which are not necessary to the invention yet are in the prior art and are necessary to the overall function of that particular claim, and should be read as including, to the maximum extent permissible by law, known functional equivalents to the elements and steps disclosed in the specification, even though those functional equivalents are not exhaustively detailed herein. Accordingly, it is intended that the appended claims are interpreted as covering all alterations and modifications as fall within the true spirit and scope of the invention in light of the prior art.

Additionally, although claims have been formulated in this application to particular combinations of steps or actions, it should be understood that the scope of the disclosure of the present application also includes any single novel step or any novel combination of steps disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

Any element in a claim that does not explicitly state "step for" performing a specified function is not to be interpreted as a "step" clause as specified in 35 U.S.C. §112, ¶6. In particular, the use of "step of" in the claims herein is not intended to invoke the provisions of 35 U.S.C. §112, ¶6.

I claim:

1. A method for milking without using any solid, external wipe or using any spray or external device to cleanse, sanitize, or dry any teat, comprising:

preparing at least one of a milker's hands, by applying an antimicrobial, preparatory, and sanitizing solution to the hand such that the front surfaces of all fingers and the palm are lubricated and coated with the antimicrobial, preparatory, and sanitizing solution; then, having the milker use the prepared hand to immediately, and simultaneously, sanitize the surface of and prime each teat in a single motion by using the lubricated surface of the palm and at least one finger to spread the antimicrobial, preparatory, and sanitizing solution over the surface of the teat;

followed directly, without drying a teat and with no further massage of a teat, by attaching a feeder tube from a milking machine to each teat.

2. A method for milking as in claim 1 wherein the step of attaching a feeder tube from a milking machine to each teat follows directly upon the sanitation and lubrication of each individual teat in turn.

3. A method for milking as in claim 1 wherein the step of attaching a feeder tube from a milking machine to each teat follows directly upon the sanitation and lubrication of all teats on the udder, without any delay for drying either teats or udder, without any continued massage of either teats or udder, without requiring or inducing a preliminary squirt of milk from any teat, or any further and intervening steps.

4. A method for milking as in claim 1 wherein the antimicrobial, preparatory, and sanitizing solution:
- is phosphorous-free;
- is neither alcohol nor halide based;
- does not contain abrasives; and,
- incorporates at least one surfactant component, an emollient component, allantoin, benzalkonium chloride, and a pH-stabilizing component;

wherein said preparatory solution is both capable of producing a suppression of observed clinical mastitis by 40% in a herd of dairy cattle after a ten week trial, and capable of penetrating the epithelial layer of the teat and through repeated use reducing the organism *Mycoplasma bovis* otherwise potentially present on or in the teat surface.

5. A method for milking as in claim 4 wherein the antimicrobial, preparatory, and sanitizing solution contains either no Rhamsan gum, or such small amount thereof so as to be neither pseudo-plastically or thixtropically-effective.

* * * * *